United States Patent
Visco et al.

(10) Patent No.: US 6,210,832 B1
(45) Date of Patent: Apr. 3, 2001

(54) MIXED IONIC ELECTRONIC CONDUCTOR COATINGS FOR REDOX ELECTRODES

(75) Inventors: Steven J. Visco, Berkeley; May-Ying Chu, Oakland, both of CA (US)

(73) Assignee: PolyPlus Battery Company, Inc., Berkeley, CA (US)

( * ) Notice: Subject to any disclaimer, the term of this patent is extended or adjusted under 35 U.S.C. 154(b) by 0 days.

(21) Appl. No.: 09/145,401

(22) Filed: Sep. 1, 1998

(51) Int. Cl.$^7$ .................................................... H01M 4/02

(52) U.S. Cl. ................................. 429/218.1; 429/231.95

(58) Field of Search ..................... 429/212, 231.95, 429/218.1; 29/623.5

(56) References Cited

U.S. PATENT DOCUMENTS

| | | | |
|---|---|---|---|
| 3,404,035 | 10/1968 | Kummer et al. | 136/6 |
| 3,413,150 | 11/1968 | Kummer et al. | 136/6 |
| 3,532,543 | 10/1970 | Nole et al. | 136/6 |
| 3,907,591 | 9/1975 | Lauck | 136/6 |
| 3,915,743 | 10/1975 | Lauck | 136/6 |
| 3,953,231 | 4/1976 | Farrington et al. | 136/6 |
| 4,143,214 | 3/1979 | Chang . | |
| 4,268,587 | 5/1981 | Farrington et al. . | |
| 4,410,609 | 10/1983 | Peled et al. | 429/105 |
| 4,469,761 | 9/1984 | Bennett et al. | 429/50 |
| 4,664,991 | 5/1987 | Perichaud et al. . | |
| 4,833,048 | 5/1989 | Dejonghe et al. | 429/104 |
| 4,917,974 | 4/1990 | De Jonghe et al. | 429/104 |
| 5,162,175 | 11/1992 | Visco et al. | 429/192 |
| 5,523,179 | 6/1996 | Chu . | |
| 5,529,860 | 6/1996 | Skotheim et al. . | |
| 5,532,077 | 7/1996 | Chu . | |
| 5,582,623 | 12/1996 | Chu . | |
| 5,686,201 | 11/1997 | Chu . | |
| 5,965,295 | * 10/1999 | Bando et al. | 429/223 |
| 6,040,087 | * 3/2000 | Kawakami | 429/218.1 |

FOREIGN PATENT DOCUMENTS

| | | | |
|---|---|---|---|
| 0602984A2 | 6/1994 | (EP) . | |
| 2 273 603A | 10/1984 | (GB) . | |
| 2 137406A | 6/1994 | (GB) . | |
| 6-275313 | 9/1994 | (JP) | H01M/10/36 |

OTHER PUBLICATIONS

Abstract of proceedings of the 6th International Symposium on Power Sources 2, 1968, Brighton, Sussex, UK, Sep. 24–26, 1968.

Coleman et al., "The Sulfur Electrode" proceedings of the 6th International Symposium on Power sources, pp. 289–302 (1968).

Visco, S.J., Liu, M., Armand, B. and De Jonghe, L.C., Solid Redox Polymerization Electrodes and Their use in All–Solid–State Batteries, Mol. Cryst. Liq. Cryst., 190, p. 198, 1990.

Societe des Accumulateurs Fixes et de Traction, "Lithium–sulfur battery" Abstracts 111055d, Chemical Abstracts 66:10360; 1967.

DeGott, P., "Polymere Carbone–Soufre Synthese Et Proprietes Electrochimiques," Doctoral Thesis at l'Institut National Polytechnique de Grenoble, (Date of Defense Jun. 19, 1986).

Lauck, H., "Stone battery with lithium anode and sulfur cathode," Abstract # 9855s, Chemical Abstracts, 80: 467–468; 1974.

Peled et al., Rechargeable Lithium–Sulfur Battery (Extended Abstact), Journal of Power Source, 26: 269–271, 1989.

Peled et al.; "Lithium–Sulfur Battery: Evaluation of Dioxolane–Based Electrolytes", J. Electrochem., Soc., 136(6): 1621–1624, Jun. 1989.

Permunage and Licht, "A Solid Sulfur Cathode for Aqueous Batteries"; Science 261: 1029–1032, Aug. 20, 1993.

Rauh et al., "Formation of Lithium Polysulfides in Aprotic Media", J. Inorg., Nuc. Chem., 39: 1761–1765, 1977.

Rauh et al. "A Lithium/Dissolved Sulfur Battery with an Organic Electrolyte"; J. Electrochem. Soc., 126(4): 523–527, Apr. 1979.

Yamin and Peled, "Electrochemistry of Nonaqueous Lithium/Sulfur Cell", J. Power Sources, 9: 281–287, 1983.

Yamin et al., Lithium Sulfur Battery,: J. Electrochem. Soc., 135(5): 1045–1048, May 1988.

S.J. Visco, M.M. Doeff, and L.C. De Jonghe, "Thin–Film Technology for Solid–State Lithium Batteries Employing Solid Redox Poly–Merization Cathodes", pp. 89–92, Society of Vacuum Coaters, 1991.

Liu, Meilin, Visco, Steven J., and De Jonghe, Lutgard C., "Novel Solid Redox Polymerization Electrodes Electrochemical Properties", J. Electrochem Soc., vol. 138, No. 7, pp. 1896–1901, Jul. 1991.

(List continued on next page.)

Primary Examiner—Stephen Kalafut
Assistant Examiner—Monique Wills
(74) Attorney, Agent, or Firm—Beyer Weaver & Thomas, LLP

(57) ABSTRACT

Disclosed is a redox electrode for a battery cell that has a coating to mitigate plugging by precipitated discharge products. The coating comprises a mixed ionic electronic conductor (MIEC) which is applied to the surface of a redox electrode. The presence of the MIEC coating allows for rapid removal of discharge product precipitates from redox electrodes since it is capable of conducting both electrons and ions. As a result, the chemical action necessary to remove such precipitates may take place on both the electrolyte side of the precipitate and at the precipitate/electrode interface. MIEC coatings in accordance with the present invention may be composed of any suitable material having ionic conductivity for a metal ion in a negative electrode with which the redox electrode is to be paired in a battery cell, and reversible redox capacity. Examples include titanium sulfide ($TiS_2$), iron sulfide ($FeS_2$), and cobalt oxides.

26 Claims, 2 Drawing Sheets

OTHER PUBLICATIONS

Liu, Meilin, Visco, Steven J., and De Jonghe, Lutgard C., "Novel Solid Redox Polymerization Electrodes All–Solid State, Thin–Film, Rechargeable Lithium Batteries", J. Electrochem Soc., vol. 138, No. 7, pp. 1891–1895, Jul. 1991.

Ue, Makoto, Visco, Steven J., and De Jonghe, Lutgard C., "Comparison of Cathode Utilization between Polymeric Organodisulfide and Titanium Disulfide in Solid Polymer Electrode Rechargeable Lithium Cells", Denki Kagaku, vol. 61, No. 12, pp. 1409–1415, 1993.

Meilin, Lui, "Novel Electrodes for Advanced Energy Storage System" Disseretation for Ph.D. at the University of Berkeley, Chapter 2, pp. 3–6, 1989.

J.R. Coleman, et al., "The Sulfur Electrode", (1968) 289–302, Defense Chemical Biological and Radiation Establishment, Defense Research Board, Ottawa, Canada.

R.D. Rauh, et al. "Rechargeablilty Studies of Ambient Temperature Lithium/Sulfur Batteries", 12th IECEC, 283–287 (1977).

S.B. Brummer, et al. "Low Temperature Lithium/Sulfur Secondary Battery", U.S. Energy Research and Development Administration Div. of Electric Energy Systems, 1–57 (1976).

A. Gavrilov, et al. "In Situ Morphological Study of Lithium–Electrolyte Interface", Electrochemical Society, (Extended Abstract).

Kavan, L., Novak, P., and Dousek, F.P., "Electrochimica Acto,"vol. 33, No. 11, pp. 1605–1612, Mar. 8, 1988, Great Britain.

Larry A. Dominey, "Lithium Batteries" New Materials, Development and Perspectives, 1994, New York, Industrial Chemistry Library, vol. 5, pp. 137–165.

Ronald Snaith, et al., "Lithium Chemistry" A Theoretical and Experimental Overview, 1995, New York, John Wiley & Sons, Inc., pp. 227–477.

* cited by examiner-

MIXED IONIC ELECTRONIC CONDUCTOR COATINGS FOR REDOX ELECTRODES

BACKGROUND OF THE INVENTION

This invention relates generally to redox electrodes, and in particular to mixed ionic electronic conductor coatings to enhance the performance of redox electrodes in secondary battery cells.

The rapid proliferation of portable electronic devices in the international marketplace has led to a corresponding increase in the demand for advanced secondary batteries. The miniaturization of such devices as, for example, cellular phones, laptop computers, etc., has naturally fueled the desire for rechargeable batteries having high specific energies (light weight). At the same time, mounting concerns regarding the environmental impact of throwaway technologies, has caused a discernible shift away from primary batteries and towards rechargeable systems.

In addition, heightened awareness concerning toxic waste has motivated, in part, efforts to replace toxic cadmium electrodes in nickel/cadmium batteries with the more benign hydrogen storage electrodes in nickel/metal hydride cells. For the above reasons, there is a strong market potential for environmentally benign secondary battery technologies.

Secondary batteries are in widespread use in modern society, particularly in applications where large amounts of energy are not required. However, it is desirable to use batteries in applications requiring considerable power, and much effort has been expended in developing batteries suitable for high specific energy, medium power applications, such as for electric vehicles and load leveling. Of course, such batteries are also suitable for use in lower power applications such as cameras or portable recording devices.

At this time, the most common secondary batteries are probably the lead-acid batteries used in automobiles. These batteries have the advantage of being capable of operating for many charge cycles without significant loss of performance. However, such batteries have a low energy-to-weight ratio. Similar limitations are found in most other systems, such as Ni-Cd and nickel metal hydride systems.

Among the factors leading to the successful development of high specific energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-toxic, and easy to process.

Thus, a smaller, lighter, cheaper, non-toxic battery has been sought for the next generation of batteries. The low equivalent weight of lithium Tenders it attractive as a battery electrode component for improving weight ratios. Lithium provides also greater energy per volume than do the traditional battery standards, nickel and cadmium.

The low equivalent weight and low cost of sulfur and its nontoxicity renders it also an attractive candidate battery component. Successful lithium/organosulfur battery cells are known. (See, De Jonghe et al., U.S. Pat. Nos. 4,833,048 and 4,917,974; and Visco et al., U.S. Pat. No. 5,162,175.)

Recent developments in ambient-temperature sulfur electrode technology may provide commercially viable rechargeable lithium-sulfur batteries. Chu and colleagues are largely responsible for these developments which are described in U.S. Pat. Nos. 5,582,623 and 5,523,179 (issued to Chu). The patents disclose a sulfur-based positive electrode for a battery cell that has low equivalent weight and high cell voltage and consequently a high specific energy (greater than about 120 Wh/kg). The disclosed positive electrode addresses deficiencies in the prior art to provide a high capacity sulfur-based positive composite electrode suitable for use with metal (such as lithium) negative electrodes in secondary battery cells. These developments allow electrochemical utilization of elemental sulfur at levels of 50% and higher over multiple cycles. Because sulfur has a theoretical maximum capacity of 1675 milliamp-hours per gram (mAh/g) (assuming all sulfur atoms in an electrode are fully reduced during discharge), the utilization of sulfur in lithium-sulfur cells as described in the above Chu patents typically exceeds 800 mAh/g of sulfur.

The sulfur-based positive redox electrodes described in the above Chu patents provide increased capacity over previously available redox electrodes, such as in the above-noted lead-acid batteries. However, like previous battery designs, they are susceptible to precipitation of reduced end-product discharge material onto electrode current collectors. This precipitated discharge material must be removed chemically by extracting ions from the precipitate. Many conventional redox electrodes are composed of a mixture of an electrochemically active agent, an ionic conductor and an electronic conductor. Carbon-based redox electrodes, that is, electrodes that use carbon as an electronic conductor, are common. Discharge material precipitated on the electronic conductor in conventional redox electrodes is difficult to remove since ions cannot be extracted at the precipitate/electrode interface (since the electronic conductor cannot conduct ions). Instead, the chemical extraction of the ions must take place by dissolution of the precipitate into the electrolyte, a time-consuming process. The precipitate renders that part of the electrode on which it is deposited effectively inactive until the precipitate is removed. An electrode which has discharge product deposited on its surface detracting from its performance is sometimes referred to as "plugged".

An example of this situation is illustrated in FIG. 1. The figure shows a representation of the carbon-based positive electrode 100 of a lithium-sulfur secondary battery cell. One of the main components of the positive electrode is the carbon electronic conductor. As the sulfur of the positive electrode, in this case the active-sulfur compound $Li_2S_8$, is reduced during discharge of the battery cell, as indicated by the dashed line 102 representing the discharge profile of the active-sulfur, it is gradually converted to the lower sulfides until the nonconductive discharge product $Li_2S$ is obtained. At high concentrations near the electrode 100, $Li_2S$ (and/or other reduced polysulfides, such as $Li_2S_2$ or $Li_2S_3$) comes out of solution and precipitates on the electrode surface. The $Li_2S$ precipitate 104 plugs the electrode, preventing other chemical reactions from occurring where it forms, detracting from the electrode's performance. In order to remove the precipitate 104 from the electrode surface and restore the performance of the electrode, the $Li_2S$ must be oxidized by extracting $Li^+$ ions. However, where the $Li_2S$ is precipitated on the carbon electronically conductive component of the positive electrode, ions can only be extracted from the back (electrolyte) side of the precipitate 104, since the carbon is not an ionic conductor. Removal thus relies on relatively slow dissolution of the precipitate from the back side, which is further slowed since a substantial portion of the surface area of the precipitate 104 is interfaced with the electrode surface and unavailable for dissolution.

Accordingly, a redox electrode design which mitigates this electrode plugging would enhance the performance of redox electrodes, and would thus be desirable.

SUMMARY OF THE INVENTION

The present invention provides a positive redox electrode for a battery cell that has a coating to mitigate plugging by precipitated discharge products. The coating is composed of a mixed ionic electronic conductor (MIEC) with ionic conductivity for a metal ion in a negative electrode with which the positive redox electrode is to be paired in a battery cell, and reversible redox capacity. The coating is applied to the surface of the electronic conductor component of the redox electrode. The presence of the MIEC coating allows for rapid removal of discharge product precipitates from redox electrodes since it is capable of conducting both electrons and ions. As a result, the chemical action necessary to remove such precipitates may take place on both the electrolyte side of the precipitate and at the precipitate/electrode interface. MIEC coatings in accordance with the present invention may be composed of any suitable material having both the ionic and electronic conductivity features described above.

In one aspect, the present invention provides a redox electrode. The electrode includes an electrochemically active material, and an electronically conductive material, coated with a mixed ionic electronic conductor material with ionic conductivity for a metal ion in a negative electrode with which the redox electrode is to be paired in a battery cell, and reversible redox capacity, mixed with the electrochemically active material so that electrons move between the electrochemically active material and the electronically conductive material. The electrode may also include an ionically conductive material mixed with the electrochemically active material so that ions move between the ionically conductive material and the electrochemically active material.

In another aspect, the present invention provides a battery cell incorporating such a positive redox electrode. The battery cell also includes a negative electrode including a metal or metal ion, and an electrolyte separator, and possibly a current collector.

In still another aspect, the invention provides a method of making a redox electrode. The method involves coating an electronically conductive material with a mixed ionic electronic conductor material with ionic conductivity for a metal ion in a negative electrode with which the redox electrode is to be paired in a battery cell, and reversible redox capacity, and combining the coated electronically conductive material with an electrochemically active material and, optionally, an ionically conductive material. A film of these electrode components is then prepared and dried.

These and other features of the invention will be further described and exemplified in the drawings and detailed description below.

DETAILED DESCRIPTION OF THE PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides a redox electrode for a battery cell that has a coating to mitigate plugging by precipitated discharge products. The coating, which is applied to the surface of the electronic conductor component of the redox electrode, is composed of a mixed ionic electronic conductor (MIEC) intercalation material with ionic conductivity for a metal ion in a negative electrode with which the redox electrode is to be paired in a battery cell, and reversible redox capacity. The associated negative electrode may comprise, for example, an alkali metal, an alkaline earth metal, lead, zinc, or aluminum. The presence of the MIEC coating allows for more rapid removal of discharge product precipitates from redox electrodes than is possible with conventional electrode designs, since it is capable of conducting both electrons and ions. As a result, the chemical action necessary to remove such precipitates may take place on both the electrolyte side of the precipitate and at the precipitate/electrode interface.

Figure 1:
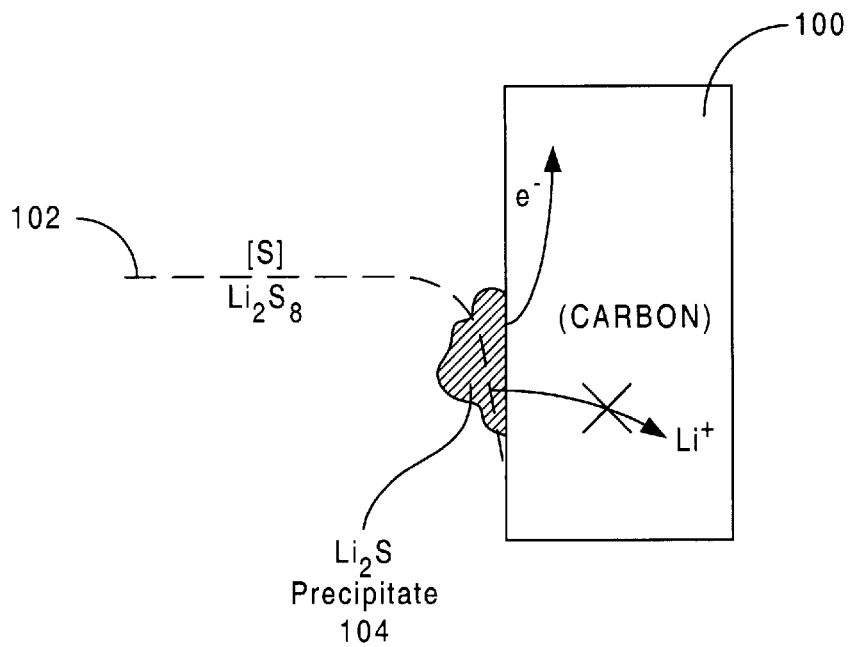
FIGS. 1 illustrates the problem of "plugging" of a conventional electrode by precipitation of reduced discharge products on the electrode surface.
Figure 2:
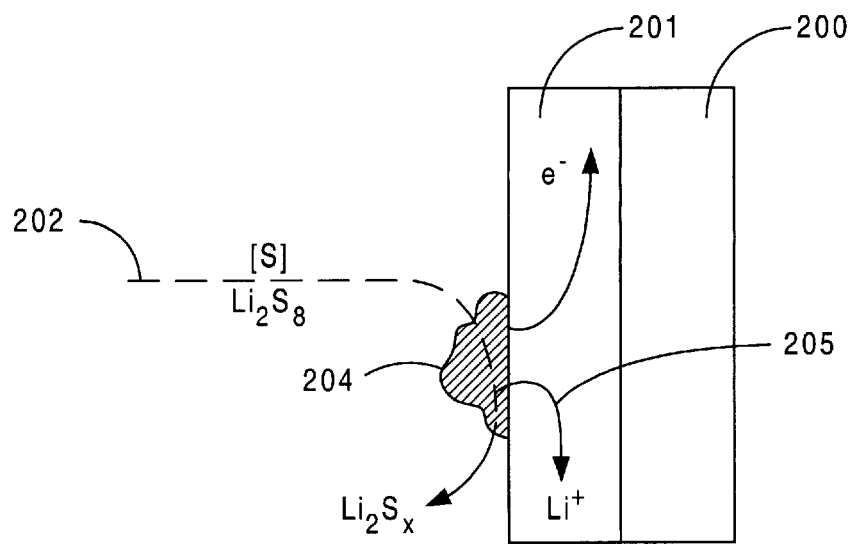
FIG. 2 illustrates the mitigation of the plugging problem by an MIEC-coated redox electrode in accordance with a preferred embodiment of the present invention.

FIG. 2 shows a representation of a MIEC-coated positive electrode 200 of a lithium-sulfur secondary battery cell in accordance with a preferred embodiment of the present invention. The electrode 200 may have a standard composition with a mixture containing an electrochemically active material, for example an active-sulfur compound such as those described in U.S. Pat. No. 5,523,179 and related patents and applications, which are incorporated herein by reference for all purposes, an electronic conductor, for example carbon, and an ionic conductor, for example polyethylene oxide (PEO). The electronic conductor component of the electrode 200 is coated with a coating 201 composed of a mixed ionic electronic conducting (MIEC) intercalation compound, for example $TiS_2$. As noted above, the MIEC coating is selected to have ionic conductivity for a metal ion in a negative electrode with which the redox electrode is to be paired in a battery cell, and reversible redox capacity. For example, in a lithium-sulfur battery, the MIEC should have ionic conductivity for lithium ions.

In one embodiment of the present invention, the electronic conductor may be a carbon paper, which is coated with a MIEC in accordance with the present invention and impregnated with the remaining electrode components (electrochemically active material and ionically conductive material). In other embodiments, the electronic conductor may be carbon fibers or particles which are coated with a MIEC in accordance with the present invention and then combined with the remaining electrode components, homogenized, and formed into a film on a substrate, for example, a metal current collector. Of course, other implementations of the present invention consistent with the description herein are also possible.

As the sulfur of the positive electrode, in this case the active-sulfur compound $Li_2S_8$, is reduced during discharge of the battery cell, as indicated by the dashed line 202 representing the discharge profile of the active-sulfur, it is gradually converted to the lower sulfides until the discharge product $Li_2S$ is obtained. At high concentrations near the electrode 200, $Li_2S$ (and/or other reduced polysulfides, such as $Li_2S_2$ or $Li_2S_3$) comes out of solution and precipitates on the electrode surface, including the MIEC coating 201 on the electrode's electronically conductive component. The $Li_2S$ precipitate 204 plugs the electrode, detracting from its performance. However, the precipitate 204 is relatively easily and rapidly removed from the electrode surface when the battery cell is placed in recharge mode, or if the MIEC is at an oxidizing potential relative to the precipitate. When oxidizing potentials are reached, the MIEC intercalation material is rapidly de-intercalated, reaching a potential oxidizing to the precipitate 204. The MIEC 210 is then able to play a large role in dissolving the precipitate 204 by extracting $Li^+$ ions, as illustrated by arrow 205.

MIEC coatings in accordance with the present invention may be composed of any suitable material having ionic conductivity for a metal ion in a negative electrode with which the redox electrode is to be paired in a battery cell, and reversible redox capacity. For lithium-sulfur batteries, examples include: $TiS_2$, which is a MIEC with lithium ion conductivity and redox capacity of $TiS_2$ to $LiTiS_2$; $FeS_2$, which is a MIEC with lithium ion conductivity and redox capacity of $FeS_2$ to $LiFeS_2$; and various phases of cobalt oxide which are MECs and have lithium and sodium ion conductivity and redox capacity (e.g., $Na_{0.5}CoO_2$ to $NaCoO_2$ and $Li_{0.5}CoO_2$ to $LiCoO_2$), allowing these materials to be used with sodium or lithium polysulfides ($Na_2S_x$ and $Li_2S_x$). It should be noted that the invention is also applicable to other types of battery systems, which are affected by electrode plugging, for example, lead-acid battery systems.

The coating should be thick enough to be able to efficiently extract ions from the precipitate. In preferred embodiments of the present invention the thickness of the coating may be from about 1000 Å to 5 μm. The coating may be applied to electronic conductors of electrodes by any number of techniques known to those of skill in the art. One particularly preferred technique for coating electrodes with MIEC coatings in accordance with the present invention is chemical vapor deposition (CVD).

Figure 3:
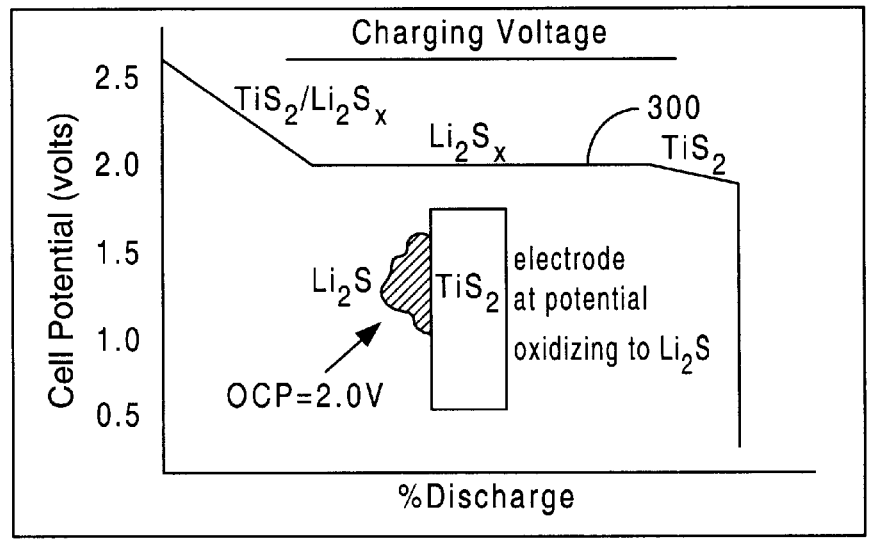
FIG. 3 depicts a voltage vs. time plot of the discharge profile of an MIEC-coated redox electrode in accordance with a preferred embodiment of the present invention.

FIG. 3 depicts a voltage vs. time plot of the discharge profile of an MIEC-coated redox electrode in accordance with a preferred embodiment of the present invention wherein an active-sulfur-based positive redox electrode in a lithium-sulfur battery cell is coated with a $TiS_2$ MIEC intercalation material in accordance with the present invention. The discharge curve 300 reflects the mixed potential of the two electroactive materials, and depends on the relative amounts of each material. As described above, the relatively insoluble and nonconductive $Li_2S$ precipitate which forms of the MIEC coating the electronic conductor of the electrode is relatively easily and rapidly removed from the electrode surface when oxidizing potentials are reached. The $TiS_2$ MIEC intercalation material is then rapidly de-intercalated, reaching a potential oxidizing to the precipitate (about 2.0 V), whereupon the MIEC is able to play a large role in dissolving the precipitate by extracting $Li^+$ ions. The $Li_2S$ precipitate is oxidized to more soluble higher polysulfides by removal of $Li^+$ ions through the MIEC, thereby facilitating removal of the precipitate from the electrode surface.

Figure 4:
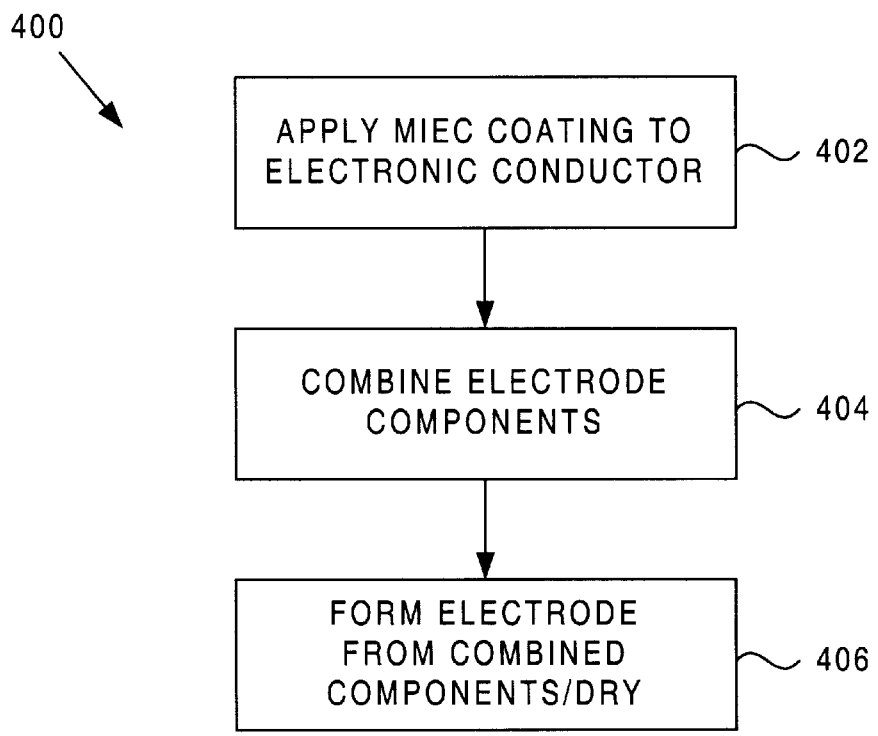
FIG. 4 illustrates a process flow for making a MIEC-coated redox electrode in accordance with a preferred embodiment of the present invention.

Redox electrodes in accordance with the present invention may be formed by a variety of processes. An example of a preferred method of making electrodes in accordance with one preferred embodiment of this invention is illustrated in the flow chart 400 of FIG. 4. The method begins with a step 402 of applying an MIEC coating in accordance with the present to an electronic conductor. As noted above, the electronic conductor may be composed of carbon and may be a carbon paper, fibers, particles, or take another form. The MIEC coating may be applied by any suitable method for the particular material being applied. A particularly preferred technique for applying MIEC materials to electrodes in accordance with the present invention is by chemical vapor deposition (CVD). $TiS_2$, for example, may be deposited on carbon fibers and or paper by plasma-enhanced CVD as described by K. Kanehori et al., Solid State Ionics 18/19 (1986) 818, which is incorporated herein by reference. As an alternative example, a carbon matrix may be coated with Ti or Fe by vacuum evaporation and subsequently reacted with S vapor to form the corresponding metal sulfide coatings.

Then, in a step 404, the electrode components are combined. Where the electronic conductor is composed of fibers or particles the electrode components (including an electrochemically active material, an ionic conductor, and the MIEC-coated electronic conductor) may be mixed in step 404, and preferably homogenized so that the electrode components are well mixed and free of agglomerates. Where the electronic conductor is composed of paper or a matrix, the MIEC-coated electronic conductor may be impregnated with the remaining electrode components (including an electrochemically active material and an ionic conductor) in step 404. In either case, a slurry may be formed by combining the electrode components with a liquid to assist in the combination.

Following the combination of the electrode components, the combined components are formed into an electrode, at a step 406. Where the electrode components are homogenized and in slurry form, the slurry may be coated on a substrate, such as a metal current collector, to form a thin film. Best results will generally be obtained if the slurry is homogenized immediately before the film formation at step 406. This ensures that the slurry components have not settled or separated to any significant degree, thus providing a uniform film with the desired ratio of electrode components. The coated film may then be dried to form the electrode. The film preferably will be sufficiently thin to allow for rapid drying so that the electrode components do not significantly redistribute during drying step 406. The actual film thickness will, of course, depend upon the amount of liquid used in the slurry. Additional details concerning the formation of thin film electrodes may be found in U.S. Pat. Nos. 5,523,179, 5,686,201, 5,789,108 and concurrently filed application Ser. No. 09/145,484, which are incorporated by reference herein. Alternatively, where the electronic conductor is impregnated with the remaining electrode components, the impregnated material may be applied to a metal current collector, for example, and dried to form the electrode. In alternative embodiments, the electronic conductor may be bonded to a metal current collector prior to being coated by the MIEC, and then combined with the remaining electrode components.

The present invention provides battery cells containing MIEC-coated redox electrodes in accordance with the present invention. Suitable batteries may be constructed according to the known art for assembling cell components and cells as desired, and any of the known configurations may be fabricated utilizing the invention. The exact structures will depend primarily upon the intended use of the battery unit. Examples include thin film with porous separator, thin film polymeric laminate, jelly roll (i.e., spirally wound), prismatic, coin cell, etc.

For example, battery cells containing active sulfur-based composite positive electrodes can be constructed, with the modifications to the electrode fabrication described above, according to conventional formats as described in the literature, for example, De Jonghe et al., U.S. Pat. No. 4,833,048 and Visco et al., U.S. Pat. No. 5,162,175. Such conventional formats are incorporated herein by reference.

As noted above, while the present invention has been described mainly in the context of lithium-sulfur batteries, the invention is not limited to lithium-sulfur secondary battery cells, but is applicable to any battery system using redox electrodes, for example lead-acid batteries.

This use of certain MIEC materials in positive electrodes may also confer the added benefit of providing positive electrodes for battery cells that have high specific energy and high discharge rate pulse capability. This aspect of MIEC incorporation into battery electrodes, as well as additional details concerning electrochemical and chemical mechanisms of composite electroactive positive electrodes and lithium-sulfur battery cells, are described in further detail in patent application Ser. No. 09/145,484, concurrently filed herewith, and incorporated by reference herein for all purposes.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

All references cited in this application are incorporated by reference for all purposes.

What is claimed is:

1. A positive redox electrode comprising:
   a) an electrochemically active material;
   b) an electronically conductive material mixed with the electrochemically active materials so that electrons move between the electrochemically active material and the electronically conductive material;
   c) a mixed ionic electronic conductor material coating said electronically conductive material, said mixed ionic electronic conductor material having ionic conductivity for a metal ion in a negative electrode with which the redox electrode is to be paired in a battery cell, and reversible redox capacity.

2. The redox electrode of claim 1, further comprising:
   c) an ionically conductive material mixed with the electrochemically active materials so that ions move between the ionically conductive material and the electrochemically active material.

3. The redox electrode of claim 1, wherein said electrochemically active material is selected from the group consisting of elemental sulfur, a metal sulfide, a metal polysulfide, and combinations thereof, wherein said metal is selected from the group consisting of alkali metals, alkaline earth metals, and mixtures of alkali and alkaline earth metals.

4. The redox electrode of claim 1, wherein said electrochemically active material comprises a lithium polysulfide.

5. The redox electrode of claim 2, wherein said ionically conductive material is a liquid, gel or solid.

6. The redox electrode of claim 1, wherein said electronically conductive material comprises carbon.

7. The redox electrode of claim 6, wherein said electronically conductive material is in the form of paper, a solid matrix, fibers, or particles.

8. The redox electrode of claim 1, wherein said mixed ionic electronic conductor material comprises $TiS_2$.

9. The redox electrode of claim 1, wherein said mixed ionic electronic conductor material comprises $FeS_2$.

10. The redox electrode of claim 1, wherein said mixed ionic electronic conductor material comprises cobalt oxide.

11. The redox electrode of claim 1, wherein said mixed ionic electronic conductor material has a thickness of about 1000 Å to 5 µm.

12. A battery cell comprising:
   a) a positive electrode comprising a mixture of
      i) an electrochemically active material, and
      ii) an electronically conductive material mixed with the electrochemically active materials so that electrons move between the electrochemically active material and the electronically conductive material,
      iii) a mixed ionic electronic conductor material coating said electronically conductive material, said mixed ionic electronic conductor material having ionic conductivity for a metal ion in a negative electrode with which the redox electrode is to be paired in a battery cell, and reversible redox capacity,
   b) a negative electrode including a metal or metal ion; and
   c) an electrolyte separator.

13. The battery cell of claim 12, wherein said redox electrode further comprises:
   ii) an ionically conductive material mixed with the electrochemically active materials so that ions move between the ionically conductive material and the electrochemically active material.

14. The battery cell of claim 12, wherein said electrochemically active material is selected from the group consisting of elemental sulfur, a metal sulfide, a metal polysulfide, and combinations thereof, wherein said metal is selected from the group consisting of alkali metals, alkaline earth metals, and mixtures of alkali and alkaline earth metals.

15. The battery cell of claim 12, wherein said first electrochemically active material comprises a lithium polysulfide.

16. The battery cell of claim 12, wherein said electronically conductive material comprises carbon.

17. The battery cell of claim 16, wherein said electronically conductive material is in the form paper, a solid matrix, fibers, or particles.

18. The battery cell of claim 12, wherein said mixed ionic electronic conductor material comprises $TiS_2$.

19. The battery cell of claim 12, wherein said mixed ionic electronic conductor material comprises $FeS_2$.

20. The battery cell of claim 12, wherein said mixed ionic electronic conductor material comprises cobalt oxide.

21. The battery cell of claim 12, wherein said mixed ionic electronic conductor material has a thickness of about 1000 Å to 5 µm.

22. The battery cell of claim 12, wherein said battery cell has a thin film format.

23. A method of making a redox electrode, comprising:
   a) coating an electronic conductor with a mixed ionic electronic conductor material coating with ionic conductivity for a metal ion in a negative electrode with which the redox electrode is to be paired in a battery cell, and reversible redox capacity;
   b) combining an electrochemically active material, and the coated electronic conductor material; and
   c) forming the electrode from the combined material.

24. The method of claim 23, further comprising combining an ionically conductive material with the electrode materials in b).

25. The method of claim 23, wherein said electronic conductor comprises fibers or particles, and step b) of said method further comprises:

i) homogenizing the electrode components;

and step c) of said method further comprises:

ii) preparing a film of the homogenized electrode components on a current collector; and
   iii) drying the film.

26. The method of claim 23, wherein said electronic conductor comprises paper or a solid matrix, and step b) of said method further comprises:

iv) impregnating the electronic conductor with the electrochemically active material and the ionically conductive material;

and step c) of said method further comprises:

v) drying the impregnated electronic conductor.

* * * * *